(12) United States Patent
Fahimi

(10) Patent No.: US 8,940,243 B1
(45) Date of Patent: Jan. 27, 2015

(54) REFORMING CHAMBER WITH CONSTANT ELECTRIC DISCHARGE TO GENERATE HYDROGEN

(71) Applicant: 19th Space Energy, LLC, Dallas, TX (US)

(72) Inventor: Babak Fahimi, Arlington, TX (US)

(73) Assignee: 19th Space Energy, LLC, Dallas, TX (US)

( * ) Notice: Subject to any disclaimer, the term of this patent is extended or adjusted under 35 U.S.C. 154(b) by 0 days.

(21) Appl. No.: 14/010,086

(22) Filed: Aug. 26, 2013

(51) Int. Cl.
*B01J 19/08* (2006.01)
*G05F 1/00* (2006.01)

(52) U.S. Cl.
USPC ..................... 422/186.04; 315/291

(58) Field of Classification Search
USPC ..................... 315/291; 422/186.04
See application file for complete search history.

(56) References Cited

U.S. PATENT DOCUMENTS

| | | | |
|---|---|---|---|
| 5,365,152 A * | 11/1994 | Ozawa et al. ................. | 315/291 |
| 7,070,634 B1 | 7/2006 | Wang | |
| 7,691,182 B1 | 4/2010 | Muradov et al. | |
| 2002/0073922 A1 | 6/2002 | Frankel et al. | |
| 2003/0176953 A1 | 9/2003 | Husted et al. | |
| 2006/0124445 A1 | 6/2006 | Labrecque et al. | |
| 2009/0258262 A1 | 10/2009 | Kaupert | |
| 2010/0003556 A1 | 1/2010 | Hartvigsen et al. | |
| 2010/0013399 A1 * | 1/2010 | Ono et al. ..................... | 315/224 |

* cited by examiner

*Primary Examiner* — Kishor Mayekar
(74) *Attorney, Agent, or Firm* — Gardere Wynne Sewell LLP; Andre M. Szuwalski

(57) ABSTRACT

A circuit applies an electric field to a reforming chamber housing a hydrocarbon-water mixture to cause molecular breakdown and create a feed of hydrogen and carbon and dioxide that can be supplied to fuel cells. The circuit includes a DC-to-DC converter, a DC-to-AC inverter and a transformer to transform available input voltage to a control voltage that can be used to apply the electric field to the mixture in the reforming chamber. The signal supplied to the DC-to-AC inverter is monitored to determine whether enough voltage is supplied to create an electrical discharge in the reforming chamber. If an electrical discharge exists, the variables to the circuit is left alone or decreased until the signal indicates the electrical discharge is no longer present. If no electrical discharge exists, the variable input voltage is increased until an electrical discharge is detected.

10 Claims, 10 Drawing Sheets

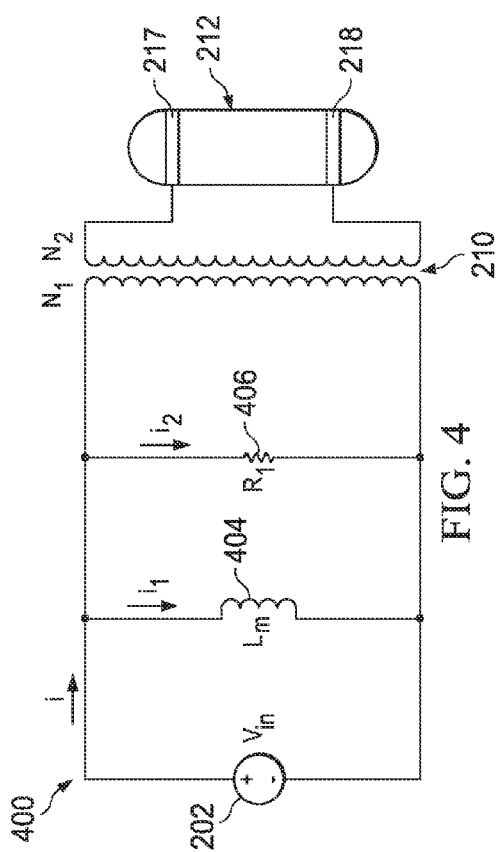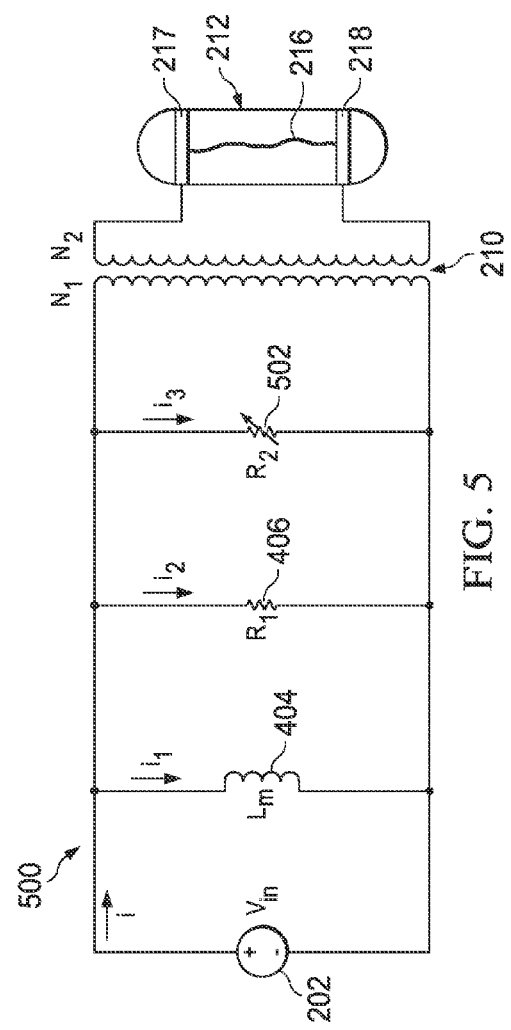

REFORMING CHAMBER WITH CONSTANT ELECTRIC DISCHARGE TO GENERATE HYDROGEN

BACKGROUND

Energy production is always racing toward the next wave of technologies that will produce cleaner, more efficient, and less expensive energy. Fuel cells are often considered one of the most efficient procedures for generating energy. The high efficiency of fuel cells and their low level of emissive pollutants justify the enormous effort made during the last years for continued research and practical implementation. But one of the major difficulties for commercially implementing fuel cells is the clean production and handling of hydrogen required for fuel cell operation.

The use of hydrogen as an energy carrier is environmentally attractive because it can be burned cleanly in a manner that only produces water ($H_2O$) and carbon dioxide ($CO_2$). Gasoline, diesel, and other fuels derived from petroleum produce much more harmful emissions. Yet, hydrogen only occurs in nature in combination with other elements, such as with oxygen in water and with carbon in hydrocarbons (e.g., propane, ethanol, etc.). Molecular hydrogen can be used as an energy carrier once it has been broken from the bonded state and combined with other elements. Unfortunately, doing so requires significant energy.

The proton exchange membrane (PEM) is among the more developed systems used in today's fuel cells. A major advantage of the PEM fuel cell is its efficiency in utilization of the fuel energy content versus, for example, the internal combustion engine. The ideal fuel for current PEM fuel cells is hydrogen. There are two well established technologies for producing pure hydrogen: a steam methane reforming process and the electrolysis of water.

Steam methane reforming is the most common process for producing hydrogen commercially. Modern steam methane reforming units produce hydrogen in a four step process. First, natural gas is processed in a pre-treat step with hydrogen to remove sulfur. Second, methane (or other hydrocarbon) mixed with steam is passed over a nickel oxide catalyst at temperatures of 700°-1000° C. and at nearly 30 atm to produce hydrogen and carbon monoxide (CO). This reaction is highly endothermic, requiring a substantial amount of heat. Third, the hydrogen and carbon monoxide are supplied to a water-gas shift reactor that adds water to produce additional hydrogen and carbon dioxide. This reaction is exothermic and is readily carried out between 200°-350° C. Fourth, the hydrogen is then purified before being sent to other devices for use. The entire process requires a large amount of heat and ends up generating considerable amounts of poisonous carbon monoxide.

Hydrogen can also be produced through the electrolysis of water. The cost of producing hydrogen by electrolysis via current electrolytic processes is largely dependent on the cost of electricity, the efficiency of the process, and the capital costs of the systems involved. Today's electrolysis systems are highly inefficient, and the energy required to produce hydrogen is expensive. A reduction in the system capital costs and improvement in system efficiency are needed to make electrolysis more competitive for widespread use.

SUMMARY

This Summary is provided to introduce a selection of concepts in a simplified form that are further described below in the Detailed Description. This Summary is not intended to identify key or essential features of the claimed subject matter, but instead is provided to illustrate different embodiments.

One embodiment is directed to maintaining the electric field applied to a reforming chamber at a voltage high enough to cause an electrical discharge in the reforming chamber. The reforming chamber houses a gaseous hydrocarbon-water mixture, and the presence of the electrical discharge indicates that enough of an electric field is being applied to break molecular bonds and free hydrogen from the hydrocarbons and water. Embodiments described herein produce a synthetic gas (syngas) with pure hydrogen ($H_2$) that can be used by fuel cells to generate power.

One embodiment uses a circuit comprising a DC-to-DC converter, a DC-to-AC inverter and a transformer to transform a variable input voltage into an AC control voltage with a particular duty cycle that is applied across electrodes of a reforming chamber in order to excite the hydrocarbon-water mixture to the point of molecular breakdown. To ensure molecular breakdown of the hydrocarbon-water mixture, one embodiment determines whether the mixture has been excited to the point that an electrical discharge is occurring in the reforming chamber by monitoring one or more operational parameters (e.g., current or power) of the circuit. The operational parameters may be analyzed over time by a processing device to determine whether the electrical discharge is present. The processing device is configured, in one embodiment, to constantly adjust the input voltage of the circuit so that the reforming chamber always maintains an electrical discharge. Hydrogen extracted from the mixture in the reforming chamber can be supplied to a fuel cell that uses the hydrogen to generate power. The power generated by the fuel cell can then be converted into particular power, voltage, or current ratings for either an electrical grid or particular electric devices.

Another embodiment relates to management of multiple circuits applying control voltages to multiple reforming chambers. Sensors detect the current or power for each of the circuits and relay that detected information to a processing device. For each circuit, the processing device determines a time rate of change of the detected current or power and identifies whether the reforming chamber associated with the circuit is experiencing an electrical discharge. If so, the processing device may do nothing or signal a decrease of the input voltage to the circuit until the sensed time rate of change of the current or power indicates there is no longer an electrical discharge. If not, the processing device signals an increase of the input voltage to the circuit until the sensed time rate of change of the current or power indicates an electrical discharge exists in the reforming chamber.

BRIEF DESCRIPTION OF THE DRAWINGS

Embodiments are illustrated by way of example in the accompanying figures wherein:

FIG. 4 is a circuit diagram of an equivalent circuit when a reforming chamber does not have an electrical discharge;

FIG. 5 is a circuit diagram of an equivalent circuit when a reforming chamber has an electrical discharge;

DETAILED DESCRIPTION

Figure 1:
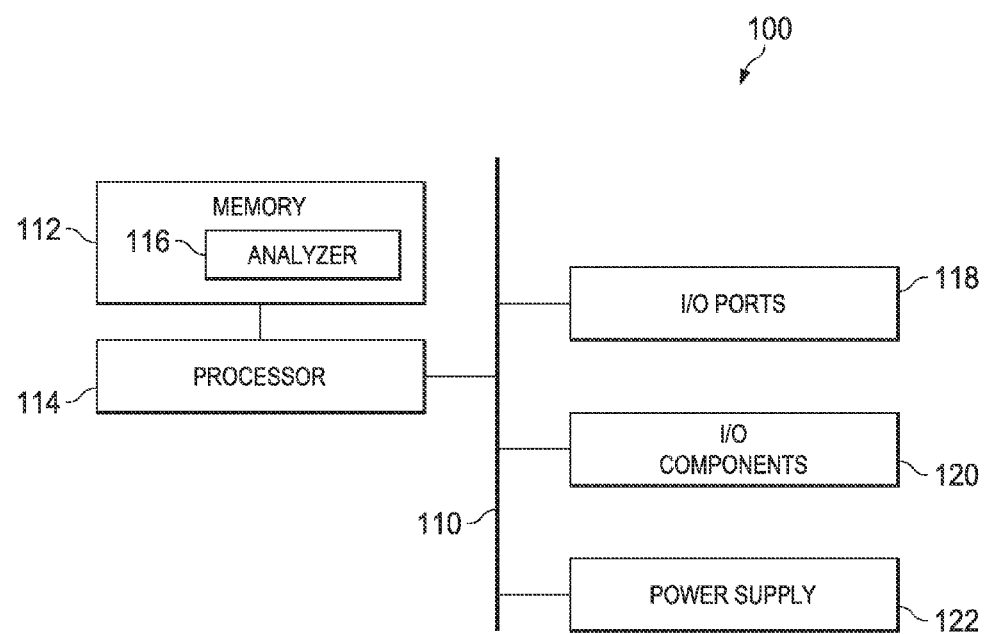
FIG. 1 is a block diagram of a processing device for analyzing the current or power signature of an electrical discharge in a reforming chamber.

Embodiments described herein generally relate to the application of an electric field to a cold-plasma reforming chamber housing a gaseous hydrocarbon-water mixture to cause molecular breakdown and create a feed of hydrogen and carbon dioxide for fuel cells. The reforming chamber includes two opposing electrodes and, in one embodiment, is filled with a hydrocarbon-water mixture. A drive signal comprising a control voltage is applied to the opposing electrodes of the reforming chamber and stepped up at a particular slew rate to excite molecules in the mixture into breaking and recombining to form a synthesis gas (syngas) mixture comprising hydrogen and carbon dioxide. The syngas may also include trace amounts of carbon monoxide and other molecules depending on the hydrocarbon and other additives included in the original mixture, and the hydrogen of the syngas may be directed toward a fuel cell that can use the hydrogen to generate electricity.

The hydrocarbons in the disclosed mixtures may be single-bonded hydrocarbons (e.g., methane, ethane, propane, butane, pentane, hexane, heptane, octane, nonane, decane, or the like); isomers (e.g., isobutane); alcohols (e.g., methanol, glycerol, etc.); ethers (dimethyl ether); aldehydes (e.g., formaldehyde); ketones (e.g., acetone); carboxylic acids (e.g., acetic acid); esters (e.g., ethyl acetate); ethanol fuel blend (e.g., E-85)), or the like. When a high enough voltage is applied to the mixture in the reforming chamber, a cold plasma is formed and hydrogen particles are separated from the other elements of the hydrocarbon. In one embodiment, water is added to the mixture so that carbon dioxide, and not carbon monoxide, is formed when the hydrocarbon is being broken. For example, the following equations show the molecular breakdown and recombination of ethanol and methane:

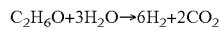

$$C_2H_6O+3H_2O \rightarrow 6H_2+2CO_2$$

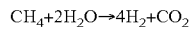

$$CH_4+2H_2O \rightarrow 4H_2+CO_2$$

These equations are provided purely for illustrative purposes, as there are numerous other hydrocarbon-water mixtures that may be used. Also, while the above equations indicate only hydrogen and carbon dioxide being formed, some embodiments will experience trace amounts of carbon monoxide in the reformed mixture.

The control signal applied to the electrodes is an AC voltage with a somewhat slow frequency that may range between 1-10 kHz. Throughout each period of the AC voltage, the molecules in the reforming chamber are excited for a specific amount of time and then allowed to return to equilibrium as the AC voltage alternates from one peak voltage to the other. Allowing the molecules of reforming-chamber mixture to be excited and then relaxed has shown to produce hydrogen more efficiently from the hydrocarbon-water mixture than just applying a constant voltage.

Embodiments may supply the extracted hydrogen from the mixture in the reforming chamber to one or more fuel cells that generate electricity using the hydrogen. Examples of fuel cells that may be used include, without limitation, a PEM fuel cell (PEMFC), a solid oxide fuel cell (SOFC), an alkaline fuel cell (AFC), a molten-carbonate fuel cell (MCFC), a phosphoric-acid fuel cell (PAFC), a direct-methanol fuel cell, or the like.

Referring to the drawings in general, and initially to FIG. 1 in particular, an exemplary processing device for implementing embodiments of the present invention is shown and designated generally as processing device 100. Processing device 100 is but one example of a suitable computing environment and is not intended to suggest any limitation as to the scope of use or functionality of the invention. Neither should the processing environment 100 be interpreted as having any dependency or requirement relating to any one or combination of components illustrated.

At least one aspect of the invention may be described in the general context of computer code or machine-useable instructions, including computer-executable instructions that include program components or modules stored in computer-storage media and being executed by a processor. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, and the like. Embodiments of the invention may also be practiced in distributed computing environments where tasks are performed by remote-processing devices that are linked through a communications network.

Looking at FIG. 1, processing device 100 includes a bus 110 that directly or indirectly couples the following devices: memory 112, a processor 114, an analyzer 116, input/output (I/O) ports 118, I/O components 120, and a power supply 122. Bus 110 represents one or more busses (such as an address bus, data bus, or combination thereof). Although the various blocks of FIG. 1 are shown with lines for the sake of clarity, in reality, delineating various components is not so clear, and metaphorically, the lines would more accurately be fuzzy. For example, processors have memory. The inventors hereof recognize that such is the nature of the art, and reiterate that the diagram of FIG. 1 is merely illustrative of an exemplary processing device that can be used in connection with one or more embodiments of the present invention.

Memory 112, which is directly accessible by processor 114, includes computer-storage media in the form of volatile and/or nonvolatile memory. By way of example, and not limitation, memory 112 may comprise Random Access Memory (RAM); Read Only Memory (ROM); Electronically Erasable Programmable Read Only Memory (EEPROM); flash memory or other memory technologies; holographic media; magnetic cassettes, magnetic tape, magnetic disk storage or other magnetic storage devices, or any other medium that can be used to encode desired information and be accessed by processing device 100. The term "computer-storage media," as used herein, does not include carrier waves or other propagating signaling.

Processing device 100 includes one or more processors that read data from various entities such as memory 112 or I/O components 120. Processor 114 may be any type of microprocessor, computer processing unit (CPU), microcontroller, or digital signal processor (DSP). Such processing devices will be understood by those skilled in the art, and therefore need not be discussed at length herein.

Analyzer 116 represents machine-executable instructions embodied on memory 112 and capable of determining a time rate of change of a signal detected by one or more current or power sensors. In one embodiment, analyzer 116 calculates and uses the power or current time rate of change from a DC-to-DC converter to determine whether a reforming chamber is currently experiencing an electrical discharge. Analyzer 116 may be implemented in assembly language or source code and be configured to calculate the current or power time rate of change over a specific timeframe. For the sake of clarity, embodiments discussed herein discuss sensing and calculating current time rates of change, though alternative embodiments may do the same for power.

In one embodiment, processor 114 interprets the current time rate of change and increases or decreases a variable voltage supply in order to maintain the electrical discharge in the reforming chamber. When the sensed current time rate of change is negative, indicating no electrical discharge is present, one embodiment will direct processor 114 to increase the variable voltage supply until the current time rate of change becomes positive until an electrical discharge is present in the reforming chamber. When the sensed current time rate of change is positive, indicating an electrical discharge is present, the processor 114 may do nothing (in one embodiment) or decrease the variable voltage supply so long as the current time rate of change does not become negative (in another embodiment).

Figure 2:
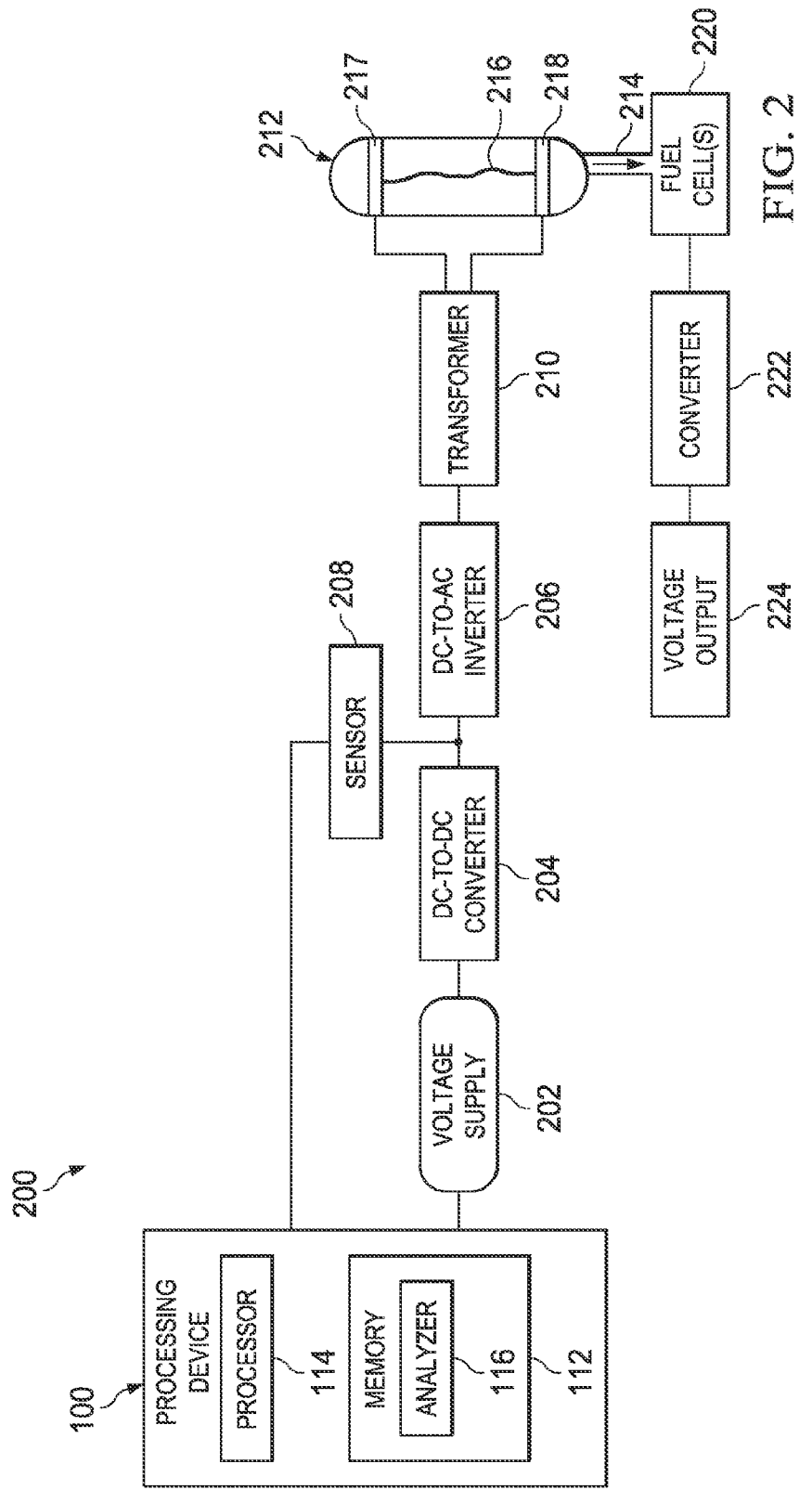
FIG. 2 is a block diagram of a configuration for efficiently maintaining a constant electrical discharge in a reforming chamber.

FIG. 2 is a block diagram of a configuration 200 for efficiently maintaining a constant electrical discharge in a reforming chamber. Configuration 200 includes a variable voltage supply 202 supplying a variable voltage to a drive circuit that comprises a DC-to-DC converter 204, a DC-to-AC inverter 206 and a transformer 210. Reforming chamber 212 is filled with a mixture of any of the previously mentioned hydrocarbons and water. Transformer 210 provides a drive voltage signal to opposing electrodes 217 and 218 and increases the drive voltage signal until an electrical discharge 216 occurs between electrodes 217 and 218.

Voltage supply 202 provides an input voltage to DC-to-DC converter 204, which reduces the input voltage by stepping it down. DC-to-AC inverter 206 converts the reduced input voltage to an AC voltage with a particular frequency (e.g., 1-2 kHz) that is then supplied to transformer 210. Voltage from transformer 210 is supplied to electrodes 217 and 218 of reforming chamber 212. If or when the voltage is large enough, an electrical discharge 216 decomposes the carbonaceous fuel (e.g., natural gas, propane, ethanol, etc.) and water of the mixture in reforming chamber 212 into elemental carbon, hydrogen, and oxygen that can then recombine into $H_2$, $CO_2$, and perhaps trace amounts of CO.

A control circuit comprising a sensor 208 and processing device 100, adjusts the variable voltage supply based on a detected operational parameter (current or power) indicating whether a reforming chamber 218 has an electrical discharge 216 or not. Electrical discharge 216 being present in reforming chamber 212 indicates that a strong enough voltage is applied across electrodes 217 and 218 to break down the hydrocarbon and water molecules in reforming chamber 212 to produce a syngas comprising hydrogen and carbon dioxide. The hydrogen in the syngas can be separated and then supplied through path 214 to the fuel cells 220.

The AC voltage from transformer 210 transitions between voltage peaks for a given frequency, and this transition results in the hydrocarbon-water mixture constantly being excited during larger voltages and relaxed toward equilibrium during smaller voltages. For example, an AC voltage with positive and negative peak amplitudes may generate electrical discharge 216 during times that the instantaneous AC voltage is within 20% off of the peak amplitudes, but may not be strong enough when less than 20% of the peak amplitudes. This effectively provides an "excited" timeframe and a "cool down" for the hydrocarbon-water mixture during each period associated with the AC voltage. Results have shown that repeatedly exciting and cooling down the molecules in the mixture causes more pure hydrogen to be extracted from the mixture in the reforming chamber than just applying a constant DC voltage.

In one embodiment, voltage supply 202 is variable and is stepped up at a particular ramp rate until electrical discharge 216 is detected in reforming chamber 212. Another embodiment may raise the input voltage by a particular amount, lower the raised voltage by a smaller amount, and then step it up again by the particular amount. For example, the voltage can be initially raised by 0.5V, then lowered by 0.1V, then raised by 0.5V, then lowered by 0.1V, etc.

In one embodiment, sensor 208 is a sensor (e.g., an inline Hall-effect sensor) that continuously detects the current coming out of DC-to-DC converter 204. Alternatively, sensor 208 may be a power sensor that detects power out of DC-to-DC converter 204.

Analyzer 116 creates a "current signature" by calculating the time rate of change of the current from the DC-to-DC converter 204. By analyzing the current signature, analyzer 116 determines whether an electrical discharge 216 is currently present in reforming chamber 212. If the slope of the current signature is negative, analyzer 116 determines no electrical discharge 216 is present in reforming chamber 212. Conversely, if the current signature is positive, analyzer 116 determines an electrical discharge 216 is present in reforming chamber 212.

Processor 114 changes the variable voltage supply 202 based on whether or not the electrical discharge 216 is present in reforming chamber 212—as indicated by the analysis of the current signature. When the current signature indicates no electrical discharge 216 is present, processor 114 sends a signal (e.g., a transistor-transistor logic (TTL) signal) to increase the input voltage from the voltage supply 202. Processor 114 may increase the input voltage from voltage supply 202 until analyzer 116 detects a positive current signature indicating the electrical discharge 216 is present in the reforming chamber 212. Conversely, when the electrical discharge 216 is present, processor 114 decreases the input voltage from voltage supply 202 so long as the current signature stays positive.

Decreasing the input voltage while the current signature stays positive reduces the power necessary for hydrogen production in reforming chamber 212. Constant monitoring of the current signature from the DC-to-DC converter 204 and corresponding adjustment of the input voltage ensures that the electrical discharge 216 is continually present and hydrogen is constantly being generated.

For the sake of clarity, embodiments discussed herein refer to current signature detection and analysis, but it should be noted that power measurements and determinations based thereon will operate in the same manner. A negative power time rate of change will indicate that no electrical discharge 216 is present in reforming chamber 212, and a positive power time rate of change will indicate that electrical discharge 216 is present. Accordingly, processing device 100 may adjust voltage supply 202 based on the analysis of the power signature—i.e., the time rate of change of the detected power signal output of DC-to-DC converter 204.

Hydrogen extracted in reforming chamber 216 and supplied to fuel cell(s) 220 cause fuel cell(s) 220 to generate power that may be converted by converter 222 to a specific voltage output 224 for supply to other devices or to an electrical grid. For example, converter 222 may convert the voltage produced by fuel cell 220 to a 120V AC voltage that can be supplied to an electrical grid. Converter 222 may include a half-wave converter, full-wave converter, push-pull converter, forward converter, or the like. Examples of such converters are illustrated in connection with FIGS. 10-12. It should also be noted that the hydrogen from reforming chamber 212 may need to be filtered (e.g., to 99.999% pure hydrogen or above) or pressurized before being supplied to the fuel cell(s) 220 in some embodiments.

Circuit 200 illustrates an embodiment where only one reforming cell 212 provides hydrogen to fuel cell(s) 220 or other devices. Some embodiments will include many separate instances of circuit 200 monitoring current power signatures that indicate whether electrical discharges 216 are occurring in numerous reforming chambers 212. In other words, circuit 200 is scalable, and each instance of circuit 200 provides an opportunity to generate more hydrogen. Such stacking of a plurality of circuits 200 may be particularly useful in power plants using many fuel cells and needing large quantities of hydrogen.

Figure 3:
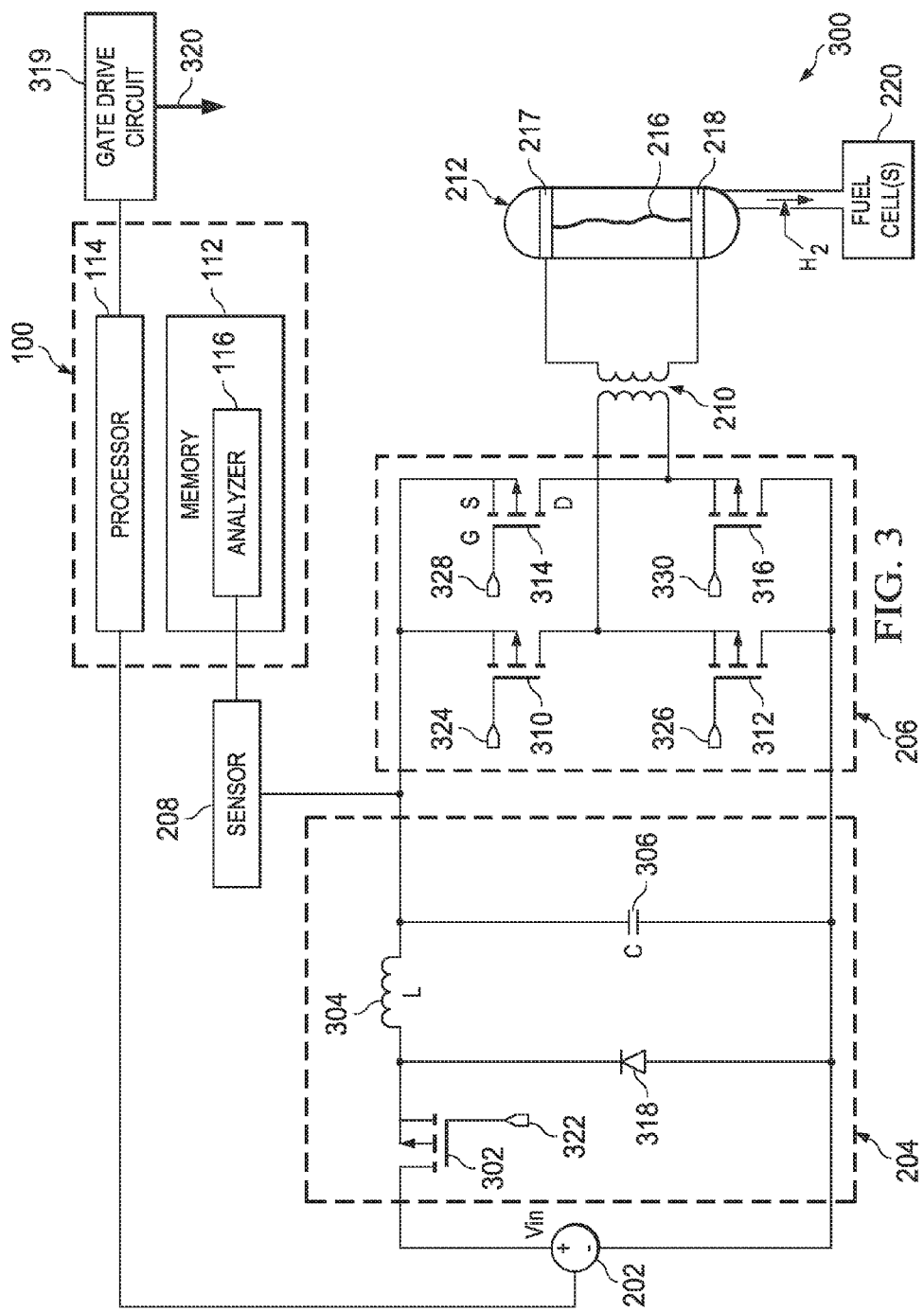
FIG. 3 is a diagram of a circuit for efficiently maintaining a constant electrical discharge in a reforming chamber.

FIG. 3 is a diagram of a circuit 300 for efficiently maintaining a constant electrical discharge in a reforming chamber. Circuit 300 includes a variable voltage supply 202, a DC-to-DC converter 204, a DC-to-AC inverter 206, a sensor 208, a transformer 210, a reforming chamber 212 and a processing device 100. These components operate to detect and maintain electrical discharge 216 in reforming chamber 212 at the lowest possible voltage. Electrical discharge 216 being present in reforming chamber 212 indicates that a strong enough voltage is applied across electrodes 217 and 218 to molecularly break up hydrocarbons and water and produce pure hydrogen ($H_2$), carbon dioxide, and other by-products (e.g., trace amounts of carbon monoxide) in reforming chamber 212. The resultant syngas, or at least the hydrogen therein, can be directed out of reforming chamber 212 through a path to fuel cells 220 for generating power that can be provided to either or electrical grid or other electrical devices.

In one embodiment, voltage supply 202 provides an input voltage to DC-to-DC converter 204. As shown, DC-to-DC converter 204 comprises a buck converter consisting of a transistor 302, an inductor L 304, a capacitor C 306 and a diode 318. These four components produce an output voltage and corresponding current that sensor 208 can detect. In one embodiment, analyzer 116 analyzes the time rate of change of the sensed current output from the buck converter to detect the electrical discharge 216. Additive impedance from electrical discharge 216 reveals itself in the form of a positive current time rate of change, referred to above as the current signature. If the current signature indicates the electrical discharge 216 is present, processor 114 is instructed to maintain input voltage 202 or reduce input voltage 202 until the current signature changes polarity (i.e., goes from positive to negative). Conversely, if the current signature indicates the electrical discharge 216 is not present, processor 114 is instructed to increase the input voltage until the current signature changes polarity (i.e., goes from negative to positive).

As previously mentioned, embodiments are not limited to using current to determine whether the electrical discharge 216 is present. Alternative embodiments will make such a determination based on power signatures measured out of the DC-to-DC converter 204.

In circuit 300, DC-to-AC inverter 206 comprises a full bridge inverter made up of four transistors 310, 312, 314 and 316 connected in the illustrated manner. The four transistors 310, 312, 314 and 316 convert the output voltage of DC-to-DC converter 204 to an AC control voltage that is supplied across transformer 210 to the electrodes 217 and 218 of reforming chamber 212. The control voltage facilitates the breakdown of the hydrocarbons and water in the mixture, and the free radical elements combine to form a syngas mixture of $H_2$ and $CO_2$ in the reforming chamber 212. The control signal applied to the electrodes is an AC voltage with a particular frequency. Because an AC voltage is applied, the molecules in the reforming chamber are only excited for a specific amount of time and then allowed to return to equilibrium as the AC voltage alternates from one peak voltage to the other, e.g., from +1.5V to −1.5V. Allowing the molecules of reforming-chamber mixture to be excited and then relaxed has shown to produce hydrogen more efficiently from the hydrocarbon-water mixture than just applying a constant DC voltage. An AC voltage with a somewhat slow frequency of 2 kHz was used in one particular embodiment, while other embodiments may use AC voltages with shorter or longer frequencies, such as e.g., 1-10 kHz.

Transistors 302, 310, 312, 314, and 316 are switched on and off by threshold signals 320 generated by gate drive circuit 319 and received at gate inputs 322, 324, 326, 328, and 330. In one embodiment, processor 114 communicates to gate drive circuit 319 low-power signals that indicate which transistors to switch on. These signals may take the form of a TTL, or similar type of signal, that are less than 3.5V and 1 mA. Gate drive circuit 319 amplifies the signals from processor 110 to threshold levels (e.g., 15V and 10 mA) and applies these amplified threshold signals 320 to the gates of transistors 302, 310, 312, 314, or 316 that processor 114 signals to be turned on. In alternative embodiments, transistors 302, 310, 312, 314, and 316 may include individual integrated gate drivers that can directly convert the low-powered signals of processor 114 to threshold signals that turn the transistors on—making gate drive circuit 319 unnecessary.

FIG. 4 is an equivalent circuit diagram of circuit 300 when no electrical discharge is present in reforming chamber 212. Equivalent circuit 400 shows the magnetizing inductance (Lm) 400 of DC-to-DC converter 204, core-loss resistance (R1) 406 of DC-to-AC converter 206, primary turn number N1 and secondary turn number N2 of transformer 210, and reforming chamber 212. The time rate of change of the current "i" shown in FIG. 4 when no electrical discharge is present can be expressed as the sum of the current through Lm (i.e., $i_1$) and the current through R1 (i.e., $i_2$), as shown in the following:

$$di/dt = Vin/Lm + Vin/R1$$

According to the above formula, the rate of change of current over time of a reforming chamber 212 with no electrical discharge 216 will have a negative slope.

FIG. 5 is an equivalent circuit diagram of circuit 300 when an electrical discharge is present in reforming chamber 212. Equivalent circuit 500 shows the magnetizing inductance (Lm) 400 of DC-to-DC converter 204, core-loss resistance (R1) 406 of the DC-to-AC converter 206, transferred resistance of the electrical discharge (R2) 502, primary turn number N1 and secondary turn number N2 of transformer 210, and reforming chamber 212. In the shown embodiment, the voltage applied to the mixture in reforming chamber 212 is strong enough to produce electrical discharge 216.

Electrical discharge 216 produces incremental impedance on the high voltage side (i.e., the side of N1) of transformer 210. This impedance, which usually exhibits a large value (e.g., 1MΩ for a 15 mm dry airgap) once transferred to the low voltage side of the transformer 210, is added to the magnetizing inductance Lm 400 and core-loss resistance R1 406. Current $i_3$ through the transferred resistance R2 502 can be expressed in the following manner:

$$i_3 = (N2/N1) * f(N2/N1) Vin$$

Where "f" is a non-linear function representing the admittance of electrical discharge 216. The time rate of change of input current "i" in FIG. 5 is the sum of currents $i_1$, $i_2$, and $i_3$, and thus can be expressed over time by the following equation:

$$di/dt = Vin/Lm + Vin * ((1/R1) + (N2/N1)^2 * df/dVin * ((N2/N1)Vin)))$$

During commutation of Vin from positive/negative to negative/positive, the input current exhibits a different current signature during the existence of electrical discharge 216 as compared to no electrical discharge 216. A positive current signature indicates electrical discharge 216 is present, and a negative current signature indicates electrical discharge 216 is not present. Thus, different current signatures detected after the DC-to-DC converter 204 will signal whether or not reforming chamber 212 has electrical discharge 216.

Figure 6:
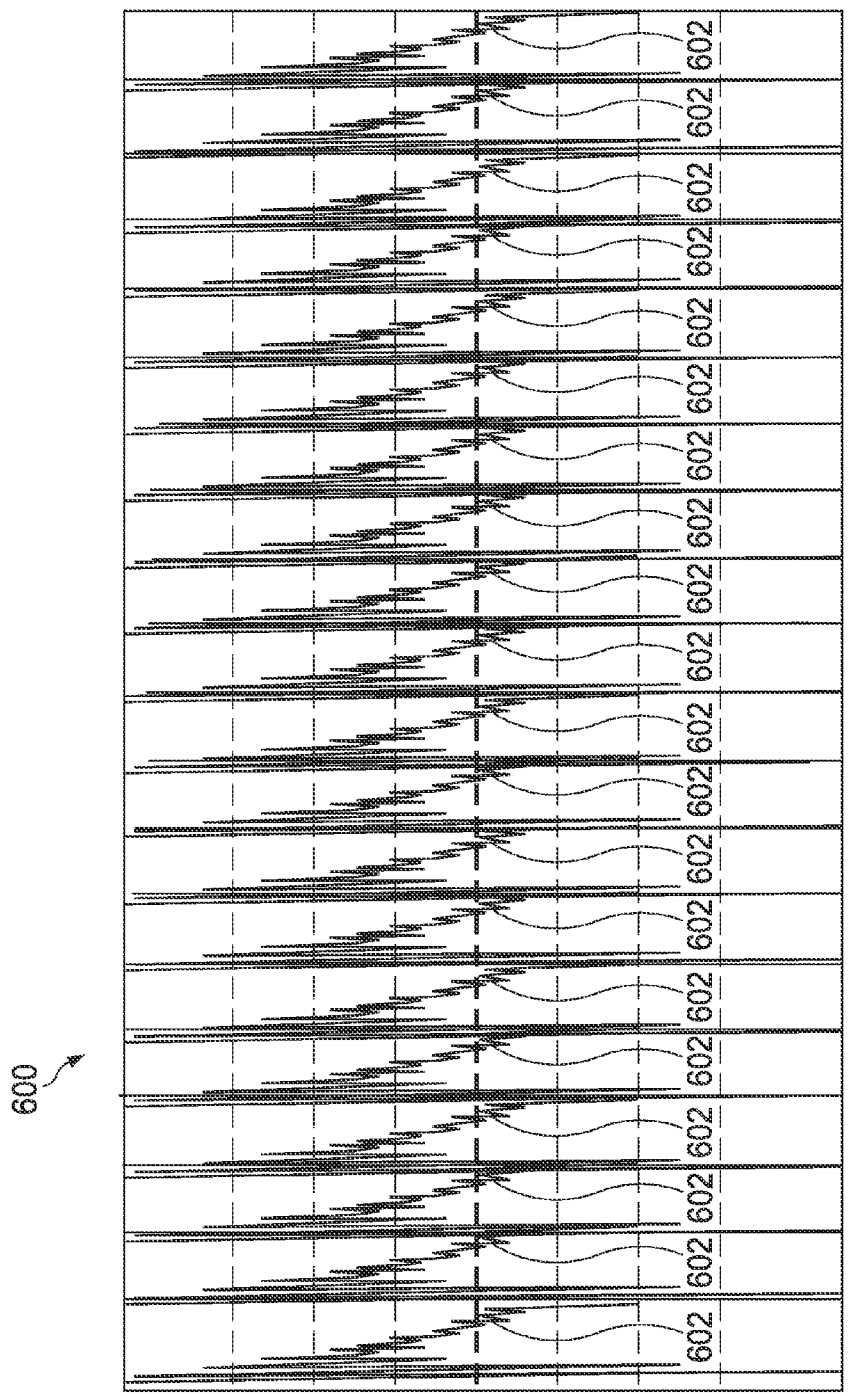
FIG. 6 is a diagram of a graph of a current signature when a reforming chamber does not have an electrical discharge.
Figure 7:
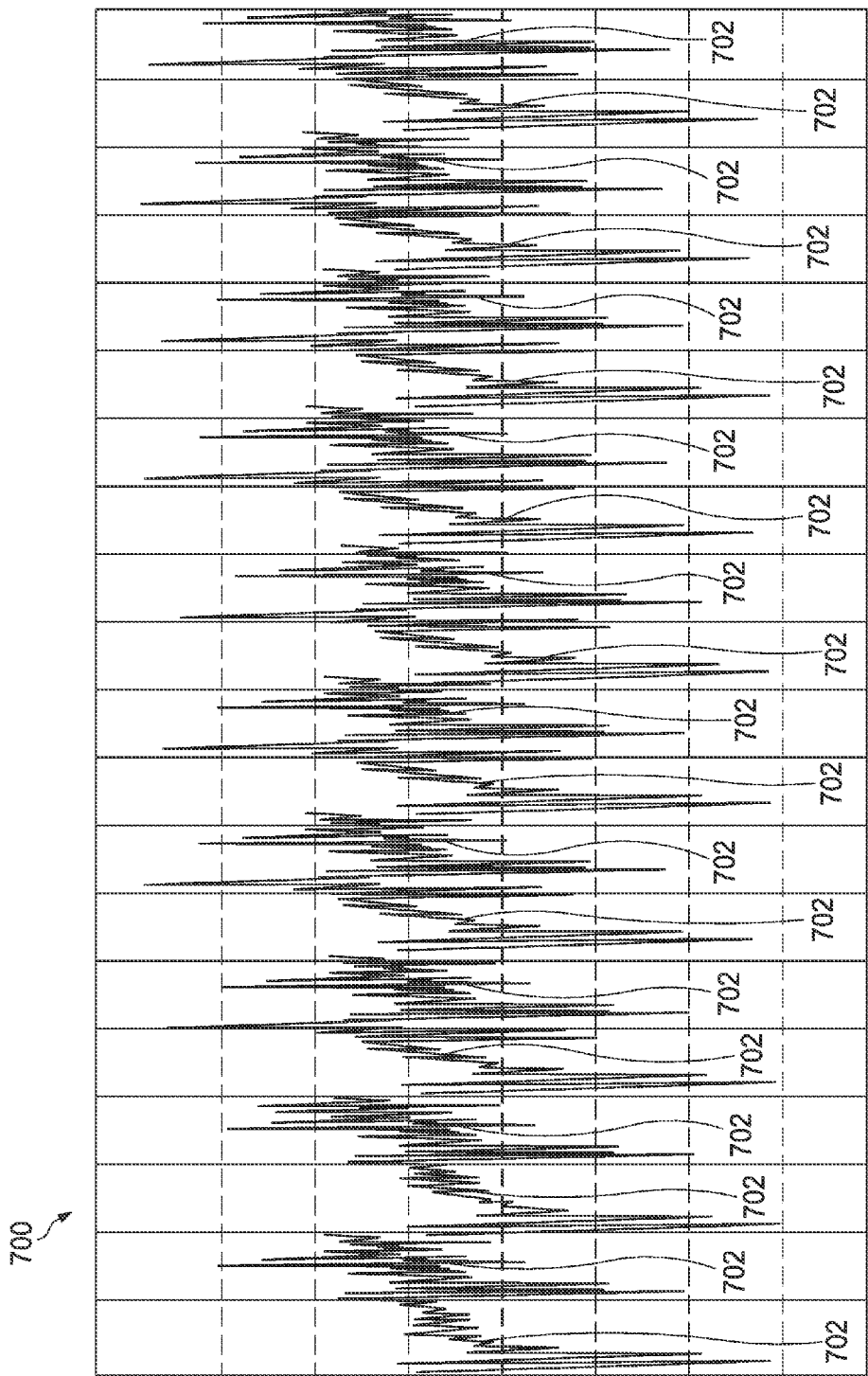
FIG. 7 is a diagram of a graph of a current signature when a reforming chamber has an electrical discharge.

FIGS. 6 and 7 are graphs of current signatures (i.e., time rates of change of current) measured by sensor 208. Graph 600 in FIG. 6 depicts current signatures of a reforming chamber with no electrical discharge, as indicated by current time rates of change 602 being negative, which is shown by repetitive negative graph slopes. Graph 700 in FIG. 7 indicates a reforming chamber experiencing an electrical discharge because the current time rates of change 702 are positive, which is shown by repetitive positive graph slopes. While graphs 600 and 700 illustrate graphs of current signatures, detected time rates of change of power act in the same manner, being negative when no electrical discharge is present and being positive when an electrical discharge is present in the reforming chamber.

Figure 8:
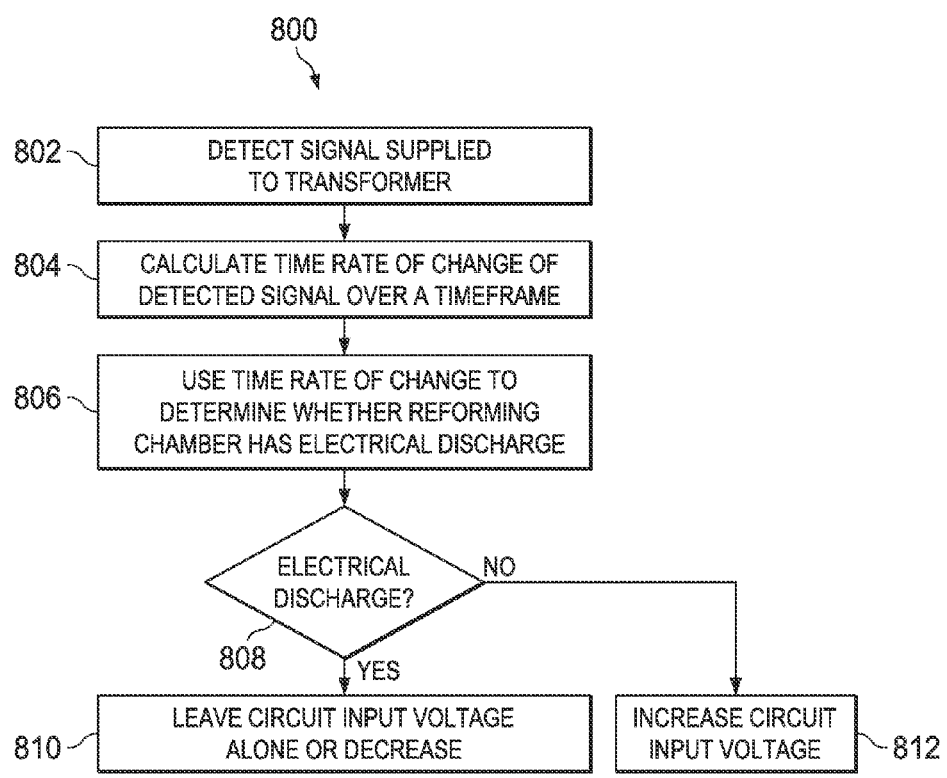
FIG. 8 is a flow chart of a process for detecting the existence of an electrical discharge in a reforming chamber and maintaining the electrical discharge.

FIG. 8 is a flow chart of a process for detecting the existence of an electrical discharge in a reforming chamber and maintaining the electrical discharge. A current or power sensor detects a current or power signal being supplied to a transformer, as shown as block 802. A time rate of change for the detected signal is computed over a particular timeframe, as shown at block 804. This time rate of change is used to determine whether the reforming chamber is presently experiencing an electrical discharge, as shown at block 806. A positive current (or power) time rate of change indicates an electrical discharge is present, and a negative current (or power) time rate of change indicates no electrical discharge is present. If the electrical discharge is determined to be present, the circuit's input voltage is left alone or decreased, as shown at block 810. On the other hand, if the electrical discharge is not present, the circuit's input voltage is increased until the current (or power) signature indicates an electrical discharge is present, as shown at block 812.

Figure 9:
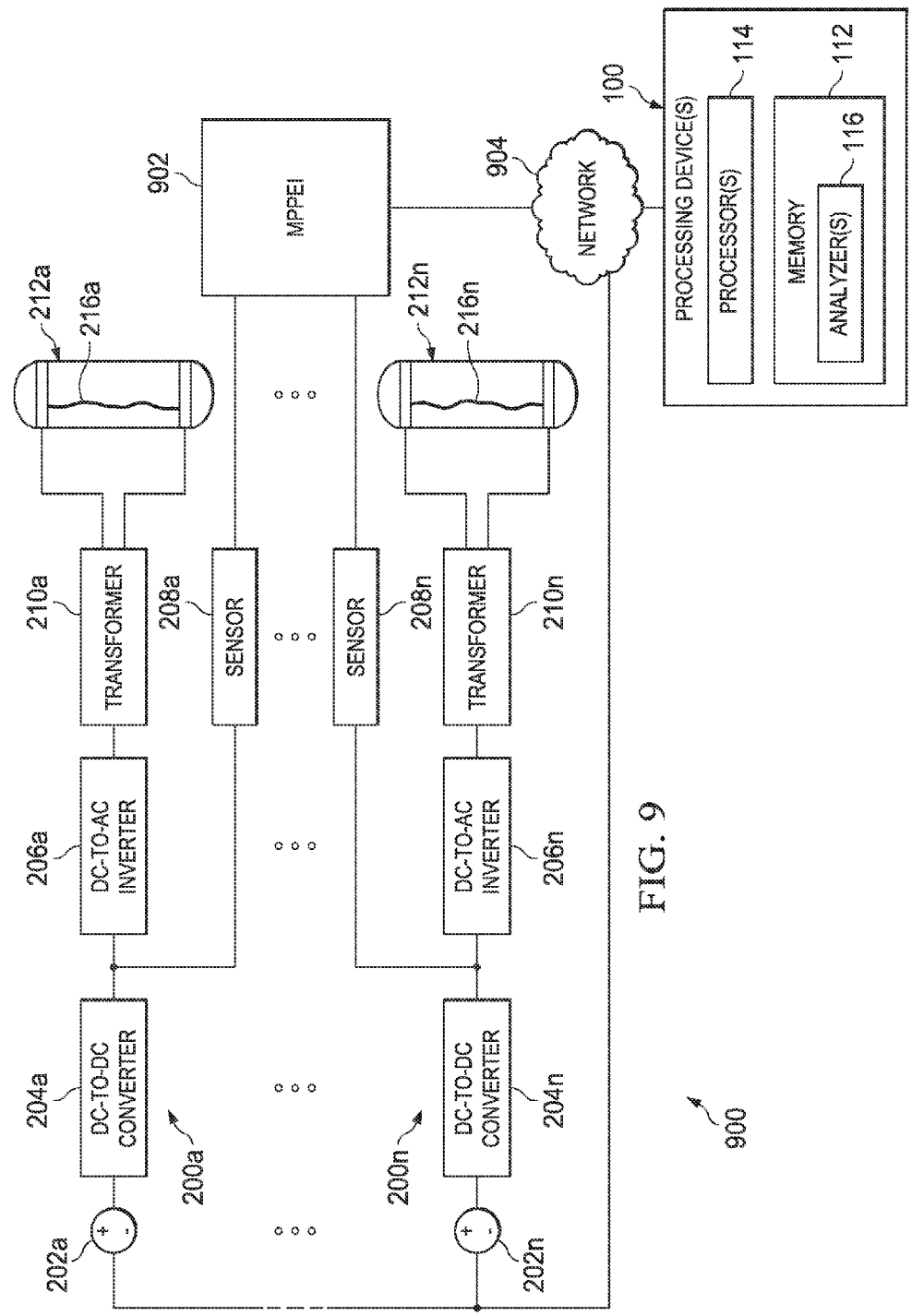
FIG. 9 is a networked environment where one or more processing devices control multiple reforming chambers.

Embodiments are not limited to just single circuits keeping electrical discharges occurring in one reforming chamber. FIG. 9 illustrates a networked environment where one or more processing devices 100 control multiple reforming chambers 212. Numerous instances of circuit 200 (shown by 200a-n) can be setup in one or more facilities. Only two circuits 200a and 200n are shown for the sake of clarity, but in reality, numerous circuits 200 may be included. Circuits 200a and 200n each include a DC-to-DC converter 204, a DC-to-AC inverter 206, a sensor 208, a transformer 210 and a reforming chamber 212 in which an electrical discharge 216 maintained. Sensors 208a and 208n are connected to a multi-port power electronics interface (MPPEI) 902 that communicates current readings to the processing device(s) 100—either directly or over a network, such as the Internet, a private virtual network, wide area network, local area network, or the like.

Processing device 100 includes one or more processors 114, memory 112, and analyzers 116 that operate to increase or decrease voltage supplies 202a and 202n based on the current voltage or power signatures of circuits 200a and 200n. In other words, processing device 100 can manage the input voltages being supplied to reforming chambers 212a-n, which may include different mixtures, so that each circuit 200 always has an electrical discharge 216.

The circuits described herein generate cold plasma and produce pure hydrogen at temperatures ranging between 130°-160° F., which is far lower than temperatures needed for steam methane reforming units. Using just enough supply voltage to maintain the electrical discharge ensures that power is not wasted while plasma in the reforming chamber is being produced.

Figure 10:
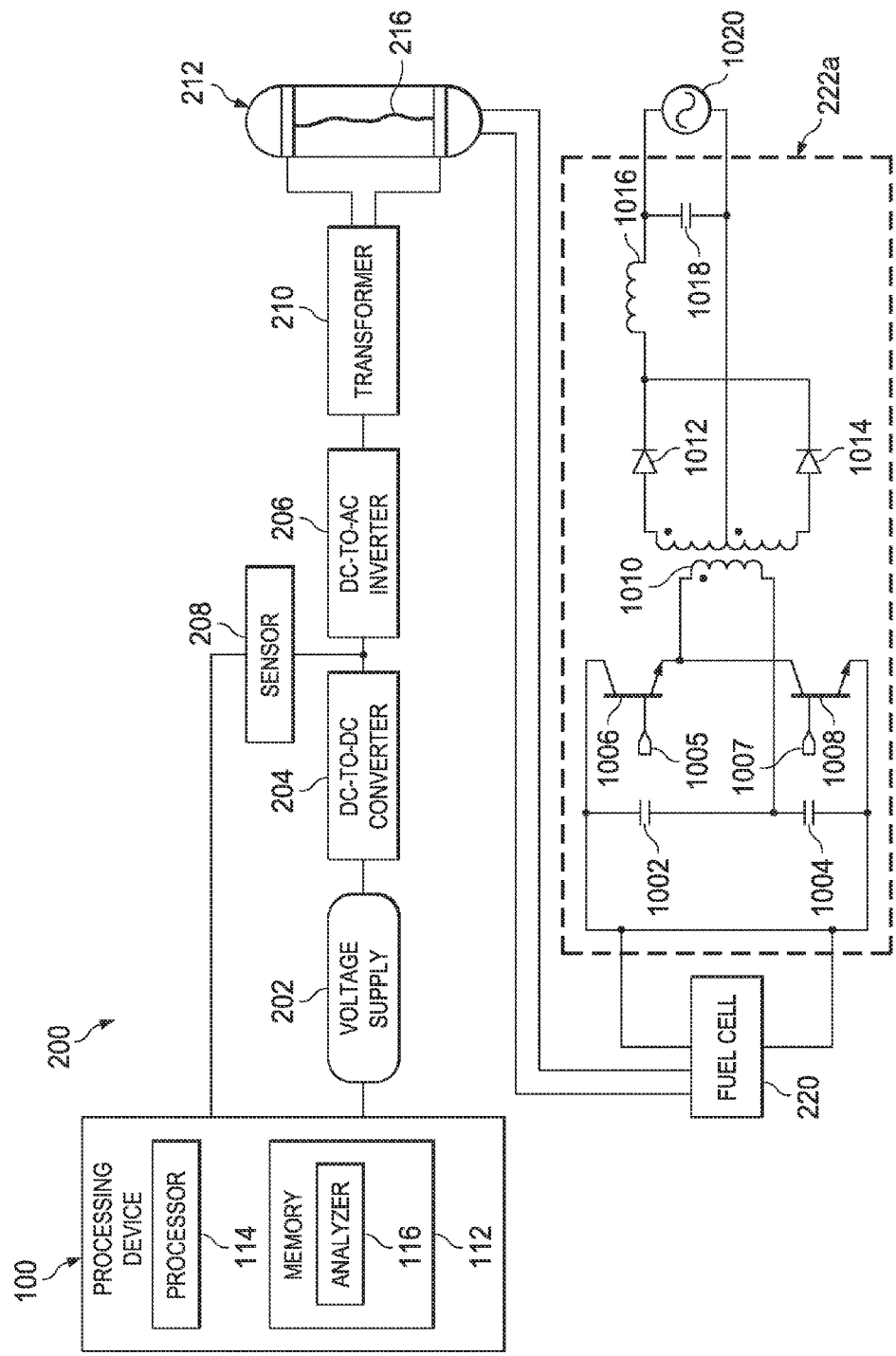
FIG. 10 is a block and schematic diagram of circuitry that uses a half-bridge converter to generate electricity from a fuel cell supplied with hydrogen that is efficiently produced in a reforming chamber.
Figure 11:
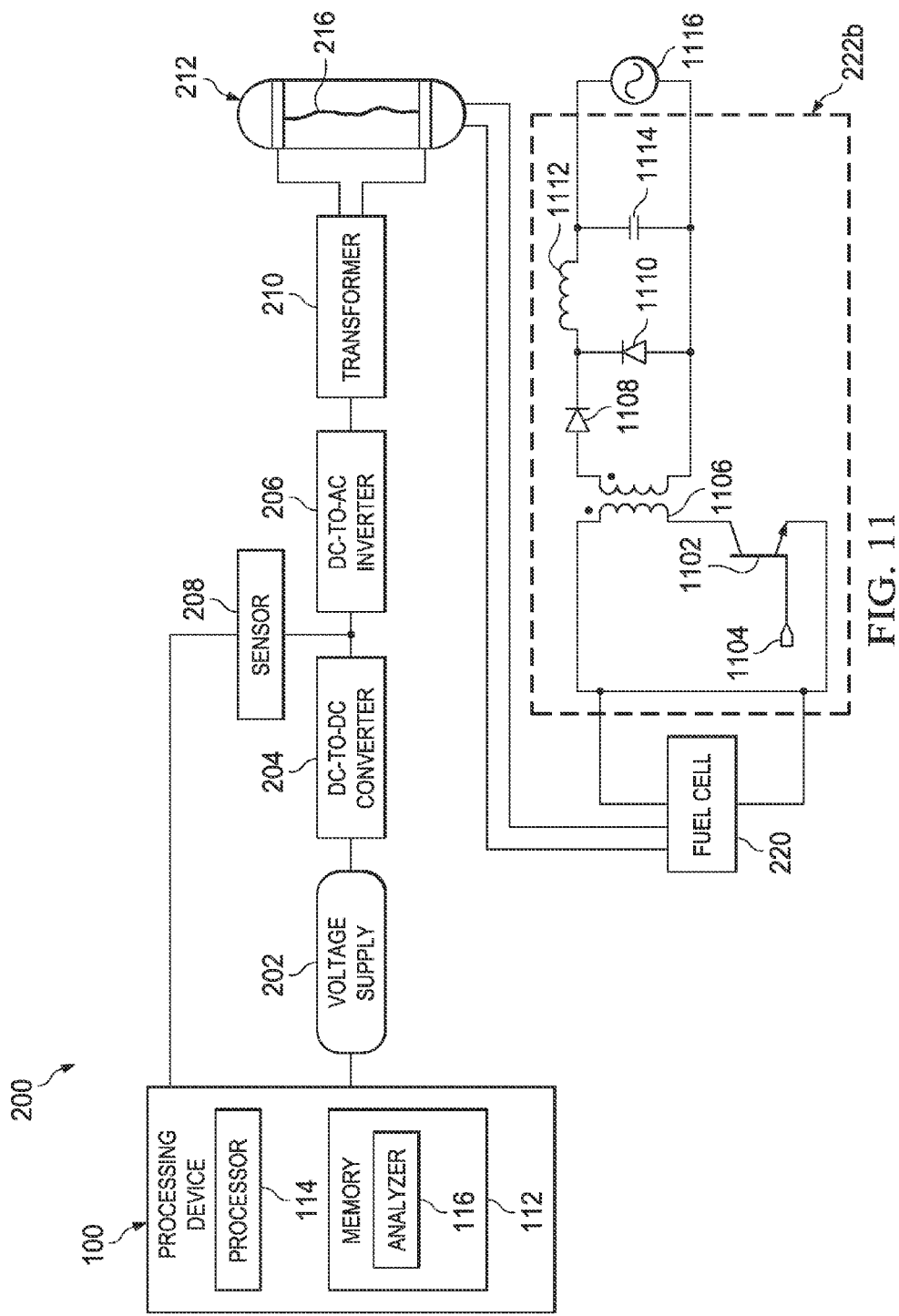
FIG. 11 is a block and schematic diagram of circuitry that uses a forward converter to generate electricity from a fuel cell supplied with hydrogen that is efficiently produced in a reforming chamber.

Previously discussed FIGS. 1-9 describe control and sensing circuitry for detecting and maintaining an electrical discharge in a reforming chamber. Fuel cells can generate power from the hydrogen that can be converted to useful voltage and/or current outputs for devices for supply to an electrical grid or other electrical devices. FIGS. 10-11 illustrate different switched-mode power supply converters 222a-b coupled to fuel cell 220 in order to generate particular voltage or current outputs. A switched-mode power converter is a frequently used component of a power supply that converts an input voltage into a specified output voltage. There are several types of switched-mode power converters including, for example, a half-bridge converter, a full-bridge converter, a forward converter, a flyback converter, a dual-complementary converter, and the like. Any of these converters, or similar alternatives, may be directly connected to fuel cells described herein to convert power generated by the fuel cells into specific AC or DC power, voltage, or current. Such converted power, voltage, or current may be directed to an electrical grid (e.g., 120V or 240V AC) or a specific device. FIGS. 10-11 illustrate two topologies: a half-bridge converter and a forward converter. These configurations are provided merely as examples of different circuits that can be used to manipulate the power generated from fuel cells 220.

FIG. 10 is a block and schematic diagram of a half-bridge converter circuit 222a coupled to fuel cell 220, which is supplied with hydrogen efficiently produced in reforming chamber 212 by control circuit 200. As described above in reference to FIG. 2, control circuit 200 includes processing device 100, a variable voltage supply 202, a DC-to-DC convert 204, a DC-to-AC inverter 206 and a transformer 210 operating to apply an AC voltage capable of generating an electrical discharge 216 between two electrodes of reforming chamber 212. Processor 114 varies the variable voltage supply 202 to keep electrical discharge 216 present in reforming chamber 212 based on detected current or power signals sensed by sensor 208 from the DC-to-DC converter 204 and subsequent calculations of power or current time rates of change by analyzer 116. The pure hydrogen resulting from the excited hydrocarbon-water mixture in the reforming chamber 212 is supplied to fuel cell 220, either directly or after being pressurized or filtered (e.g., to 99.99+% pure $H_2$). Fuel cell 220 produces power from the hydrogen of reforming chamber 216 and provides the generated power to half-bridge converter 222a.

Half-bridge converter 222a includes a transformer 1010 that receives an input voltage from fuel cell 220 and produces an output voltage 1020. The primary side of transformer 1010 consists of two switch elements, shown as transistors 1006 and 1008, and two capacitors 1002 and 1004 connected in a half-bridge configuration. In operation transistors 1006 and 1008 are switched on or off through control signals (not shown) received at inputs 1005 and 1007. When on, transistors 1006 and 1008 pass current in a complementary manner to convert the voltage from fuel cell 220 into a voltage that is applied across transformer 1010. Any DC component of the voltage applied to the primary winding of transformer 1010 is blocked by voltage-balancing capacitors 1002 or 1004. The secondary side of transformer 1010 is connected in a center-tapped configuration—though other embodiments may use a full-bridge or current-doubler configuration. Diodes 1012 and 1014 rectify a secondary voltage across the secondary winding of transformer 1010, and a low-pass filter comprising inductor 1016 and capacitor 1618 filter the rectified voltage to create a half-wave rectified voltage output voltage 1020.

FIG. 11 is a block and schematic diagram of a forward converter circuit 222b coupled to fuel cell 220, which is supplied with hydrogen efficiently produced in reforming chamber 212 by control circuit 200. As described above in reference to FIG. 2, control 200 includes processing device 100, a variable voltage supply 202, a DC-to-DC convert 204, a DC-to-AC inverter 206 and a transformer 210 operating to apply an AC voltage large enough to reforming chamber 212 to produce an electrical discharge 216 between electrodes. Processor 114 varies the variable voltage supply 202 to keep electrical discharge 216 present in reforming chamber 212 based on detected current or power signals sensed by sensor 208 from the DC-to-DC converter 204 and subsequent calculations of power or current time rates of change by analyzer 116. The pure hydrogen resulting from the excited hydrocarbon-water mixture in the reforming chamber 212 is supplied to fuel cell 220, either directly or after being pressurized or filtered (e.g., to 99.99+% pure $H_2$). Fuel cell 220 produces power from the hydrogen of reforming chamber 216 and provides the generated power to half-bridge converter 222b.

Forward converter 222b produces an isolated and controlled DC voltage from the voltage generated by fuel cell 220. When transistor 1102 is turned on by a control voltage received at input 1104, the voltage from fuel cell 220 gets applied to the primary winding of transformer 1106, consequently producing a scaled voltage appears across the secondary winding. Diode 1108 gets forward biased, and the scaled voltage from fuel cell 220 is applied to the low-pass filter comprising inductor 1112 and capacitor 1114 before proceeding to output voltage 1716.

When transistor 1102 is turned off, the primary and secondary winding currents are brought down to zero. Current through inductor 1112 and the load (not shown) of output voltage 1116 continues without any abrupt change. Diode 1110 provides a freewheeling path for this current. During freewheeling, the current of inductor 1112 will decay as it flows against the load of output voltage 1116, but the presence of filter capacitor 1114 maintains the output voltage 1116 to a near constant level.

Various modifications to the embodiments disclosed herein may be made without departing from the scope of the present disclosure and the claims provided below. The subject matter of the present invention is described with specificity herein to meet statutory requirements. The claimed subject matter might also be embodied in other ways, to include different steps or combinations of steps similar to the ones described herein, in conjunction with other present or future technologies.

What is claimed is:

1. An apparatus, comprising:
   a voltage supply configured to generate a variable voltage;
   a cold plasma reforming chamber housing a chemical mixture comprising hydrocarbon and water for generation of hydrogen from the chemical mixture;
   a drive circuit configured to receive the variable voltage and configured to generate a drive signal for application to the cold plasma reforming chamber;
   a sensor configured to sense an operational parameter of the drive circuit; and
   a controller configured to calculate a time rate of change of the operational parameter and make a determination that an electrical discharge is occurring in the cold plasma reforming chamber based on the time rate of change of the operational parameter being positive, wherein the controller is configured to control the variable voltage in response to said electrical discharge determination and maintain the generation of the hydrogen from the chemical mixture in the cold plasma reforming chamber.

2. The apparatus of claim 1, wherein the controller decreases the variable voltage when the determination indicates the electrical discharge is occurring and increases the variable voltage when the determination indicates the electrical discharge is not occurring based on the time rate of change of the operational parameter being negative.

3. The apparatus of claim 1, wherein the chemical mixture comprises at least one of ethanol, methane, and propane.

4. The apparatus of claim 1, wherein the operational parameter is a measure of current.

5. The apparatus of claim 1, wherein the operational parameter is a measure of power.

6. The apparatus of claim 1, wherein the drive circuit comprises:
   a converter configured to convert the variable voltage to a DC voltage;
   an inverter configure to generate an AC voltage based on the DC voltage; and
   a transformer receiving the AC voltage and supplying the drive signal to the cold plasma reforming chamber.

7. The apparatus of claim 1, wherein a portion of the chemical mixture molecularly breaks down and results in a synthetic gas comprising the hydrogen ($H_2$) when the electrical discharge is occurring in the cold plasma reforming chamber.

8. The apparatus of claim 1, wherein the drive signal comprises an AC voltage with a frequency ranging between 1-10 kHz.

9. The system of claim 1, wherein the operational parameter comprises at least one member of a group comprising current, power, and voltage.

10. An apparatus, comprising:
    a voltage supply configured to generate a variable voltage;
    a cold plasma reforming chamber housing a chemical mixture comprising a hydrocarbon and water;
    a drive circuit configured to receive the variable voltage and configured to generate a drive signal for application to the cold plasma reforming chamber housing for generation of hydrogen from the chemical mixture; and a control circuit including a sensor configured to sense a voltage or current output of the drive circuit, determine whether a cold plasma reaction is occurring in the cold plasma reforming chamber based on voltage or current output, and control a setting of the variable voltage based on the cold plasma reaction occurring in the cold plasma reforming chamber to maintain the generation of the hydrogen from the chemical mixture in the cold plasma reforming chamber.

* * * * *